(12) United States Patent
Vangati (10) Patent No.: US 8,185,121 B2
(45) Date of Patent: May 22, 2012

(54) OPTIMIZATION OF DISPLAYED RF COVERAGE

(75) Inventor: Mahender Vangati, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1114 days.

(21) Appl. No.: 11/848,674

(22) Filed: Aug. 31, 2007

(65) Prior Publication Data

US 2009/0063121 A1 Mar. 5, 2009

(51) Int. Cl.
*H04W 40/00* (2009.01)
*H04W 4/00* (2009.01)

(52) U.S. Cl. ............... 455/446; 455/449; 370/338

(58) Field of Classification Search ........... 455/446, 455/449; 370/338
See application file for complete search history.

(56) References Cited

U.S. PATENT DOCUMENTS

| | | | |
|---|---|---|---|
| 2003/0054813 A1* | 3/2003 | Riley et al. | 455/424 |
| 2005/0245252 A1* | 11/2005 | Kappes et al. | 455/423 |
| 2005/0272444 A1* | 12/2005 | Heffield et al. | 455/456.2 |
| 2008/0075051 A1* | 3/2008 | Dundar et al. | 370/338 |

* cited by examiner

*Primary Examiner* — Kamran Afshar
*Assistant Examiner* — Omoniyi Obayanju (57) ABSTRACT

A method for optimizing RF coverage includes dividing a floor plan according to a plurality of grids. Radio frequency coverage for each of the plurality of grids is calculated to render a plurality of coverages. First data representative of the plurality of coverage grids is provided to a client. Second data representative of an incremental change in radio frequency coverage for a first grid of the plurality of grids is provided to the client.

18 Claims, 3 Drawing Sheets

OPTIMIZATION OF DISPLAYED RF COVERAGE

FIELD OF THE INVENTION

The present invention generally relates to radio frequency (RF) devices, and more particularly relates to a method and system of optimizing displayed RF coverage.

BACKGROUND OF THE INVENTION

Radio frequency (RF) devices such as switches, access points, ports and radio frequency identification (RFID) systems are becoming more commonplace in today's society. An important criteria for the development and implementation of such devices is the determination of the respective RF coverage area for each of these devices so that each RF device facilitates the movement of information effectively. These coverage areas are affected by various physical and environmental factors. For example, the presence of dry walls, shelving, and metal doors are barriers to the RF signal. Various physical locations may be subject to noise (or use restrictions of the RF signal).

Because so many variables affect the RF coverage over a specified area, it can become difficult for a user to determine what the respective RF coverage for a specific location would be. Accordingly, it is desirable to implement a method and system for displaying RF coverage over a specified geographical area to a user, so the user might optimize particular RF coverage by, for example, positioning or configuring RF devices appropriately in the respective geographical area. It is desirable for such a system to make use of existing processing capabilities and system resources to reduce cost. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system is provided for optimizing radio frequency (RF) coverage. The system comprises means for dividing a floor plan according to a plurality of grids, means for calculating radio frequency coverage for each of the plurality of grids to render a plurality of coverages, means for providing first data representative of the plurality of coverage grids to a client, and means for providing second data representative of an incremental change in radio frequency coverage for a first grid of the plurality of grids to the client.

A method is provided for optimizing displayed radio frequency (RF) coverage data. The method comprises dividing a floor plan according to a plurality of grids. Radio frequency coverage for each of the plurality of grids is calculated to render a plurality of coverages. First data representative of the plurality of coverage grids is provided to a client. Second data representative of an incremental change in radio frequency coverage for a first grid of the plurality of grids is provided to the client.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following description relates to a system and method of efficiently displaying respective RF coverage information (relating to such RF devices as access points and other such RF components). In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

In the following description and claimed subject matter, a system and method for optimizing displayed radio frequency coverage information, is presented. Such a system and method utilizes programming techniques. One of these programming techniques is an Asynchronous JavaScript and XML (AJAX) methodology as will be further described. Similar programming methodologies, however, may be implemented. The implementation of such methodologies consumes less system bandwidth and resources. Generally speaking, the radio frequency coverage information may be displayed using a browser which is operational on a client. The client may be a computer workstation with a connected display, which is connected to a remote server.

In one embodiment, the client may execute a browser application such as Microsoft Internet Explorer® or Mozilla® Firefox®. The browser may be a software application that enables a user to display and interact with text, images, and other information typically located on a web page at a website, on the world wide web (WWW) or a local area network. In the instant description, the browser application may process data received from the remote server. As will be described further, the browser application may process raw data sent by the server. In one embodiment, the raw data does not include format or setup data, but simply represents the RF coverage. For example, the raw data may include a plurality of signal strength data measured at an instant in time or averaged over a period of time. The processed raw data may be interpreted by the browser application and displayed to the user.

In a preliminary first step, the remote server may provide the client, and thereby the browser, with formatting and/or setup data. The browser executes on the client and processes the formatting and setup data. The setup and formatting information may, in one embodiment, be embedded in a hypertext markup language (HTML) format. The formatting information may include information relating to a site, such as floor plan data. Such formatting information is processed by the browser to generate the floor plan on the client display connected to the client.

Once the browser is operational and has processed the initial formatting and setup information, the client (browser) may make a request to the remote server for RF coverage data from the server representative of a particular site and/or floor plan. The RF coverage data may be supplied by a variety of RF devices operating in the wireless environment, as will be further described. This RF coverage raw data may take the form of extensible markup language (XML) raw data. The remote server may analyze received signal strength information received from the RF devices and covert the signal strength information into the raw RF coverage data. This RF coverage raw data may take the form of extensible markup language (XML) data. The raw data is processed by the formatting and setup language to construct and plot an overall RF coverage representation (e.g., map) to the user.

From this point in the process onwards, the server, subject to a request from the client, provides additional raw data representing only a portion of the site and/or floor plan. Accordingly, such additional raw data corresponds to a small fraction of the original raw data sent earlier to construct the original representation. The additional raw data again can take the form of XML data. The additional raw data is used by the formatting data on a supplemental basis to update the overall radio frequency coverage representation.

By sending only a fraction of the original raw data as needed on an incremental and supplemental basis, the respective data connection between the server and the client consumes appreciably less bandwidth, leaving processing and computing resources open for other uses.

Figure 1:
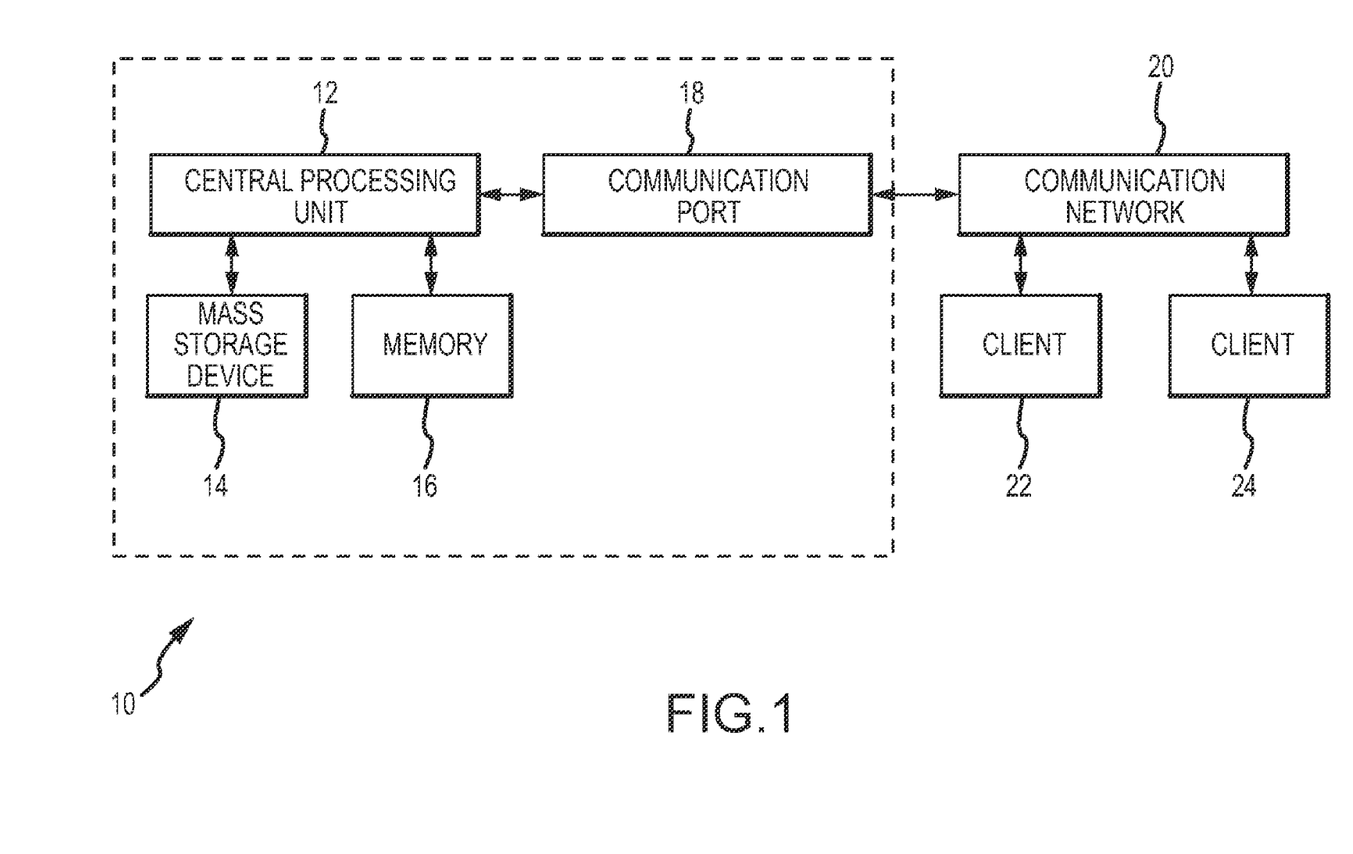
FIG. 1 is a block diagram of a computer system, including a server and a client.

Referring to the block diagram shown in FIG. 1, an exemplary system for displaying RF coverage to a user includes a server 10. Server 10 may include a central processing unit (CPU) 12 that is coupled to a mass storage device 14 such as a hard disk drive (HDD), a redundant array of independent disks (RAID), or an equivalent. In addition, CPU 12 is coupled to memory 16, which may include several types of memory, such as nonvolatile read only memory (NVROM), synchronous dynamic random access memory (SDRAM), and so-called "flash memory."

CPU 12 is coupled through a communication port 18 to a communication network 20. Communication network 20 may include a variety of technologies, such as the aforementioned 802.11 family of specifications, or a gigabit Ethernet network. Clients 22 and 24 are coupled through the communication network 20 to the server 10. Clients 22, as one skilled in the art will appreciate, may include additional processing components, memory components, and the like, in order to execute computer program instructions and display information to a graphical user interface.

For example, server 10 and clients 22, 24 may include operating systems and related software and firmware for executing computer program instructions. Clients 22 and 24 may be configured to execute a browser application. Such a browser application may be further configured to execute commands embedded as hypertext markup language (HTML), or process raw data formatted in extensible markup language (XML). The browser application may be enabled to execute computer programs formatted in JavaScript®.

Clients 22 and 24, as well as server 10, may be configured to execute similar applications as appropriate for a specific implementation. Finally, the applicable computer programs executable on clients 22, 24, and server 10, may be embodied in computer program products. The computer program products may include a computer-usable medium having computer-readable code readable thereon. Such computer-usable mediums may include compact disks (CDs) or digital versatile disks (DVDs) or an equivalent. Such computer-readable code may be stored in locations as mass storage device 14, memory 16, or elsewhere.

As previously described, the following description relates to RF coverage over a specified area (such as a floor plan). Various RF devices, such as wireless access points (APs), which send and receive RF signals to various devices (which may include clients 22 and 24). An AP or other RF device may be provided within an environment defined by a boundary as will be further described. The AP has an associated RF coverage area (or simply "coverage"), which corresponds to the effective range of its antenna or RF transmitter, as described in further detail below.

The environment, which may correspond to a workplace, a retail store, a home, a warehouse, or any other such space (including outdoors and/or indoors), will typically include various physical features that affect the nature and/or strength of RF signals received and/or sent by the AP. Such feature include, for example, architectural structures such as doors, windows, partitions, walls, ceilings, floors, machinery, lighting fixtures, and the like.

The boundary may have any arbitrary geometric shape, and need not be rectangular as shown in the illustration. Indeed, the boundary may comprise multiple topologically unconnected spaces, and need not encompass the entire workplace in which the AP is deployed. Furthermore, the present invention is not limited to two-dimensional layouts; it may be extended to three dimensional spaces as well.

An AP or other RF devices may be configured to wirelessly connect to one or more mobile units (MUs) and communicate one or more switches, routers, or other networked components via appropriate communication lines. These communication components may make up a portion, or all, of communication network 20 (FIG. 1). RF devices such as APs and MUs collectively provide RF signal coverage across a respective environment, such as a floor plan. The RF devices such as APs and MUs may provide coverage data, such as data in the form of RF signal strength information associated with a portion of a floor plan, to the server to be interpreted and/or converted into RF coverage raw data that is passed to the client.

In light of the foregoing description, a technique may be implemented where RF coverage data is conveyed to a client, and thereby, a user by ultimately exchanging relatively small amounts of raw data with the server behind the scenes. In cases where a browser is utilized, it is not necessary, as a result, for an entire page to be reloaded each time a user requests a change or an update. As a result, the browser's interactivity, speed, functionality, and usability are increased.

Consider an exemplary method of displaying RF coverage. The method begins with the facilitation of formatting and/or setup data to the client. In cases where a browser application executes on the client, the browser may obtain the formatting and setup data in order to construct a browser window with accompanying functionality specified in the formatting data. Accordingly, the formatting and setup data may include code usable by the browser to construct the browser window.

Based on the formatting and setup data, the client may use onboard applications (again, such as browser capabilities) to build a map of a site, such as a floor plan. Such a site may be described by parameters such as boundaries or identification information as will be further described.

The server then provides RF coverage raw data to the client. This RF coverage information may be obtained from information such as signal strength information which is provided to the server from one or more RF devices in the network. For example, a MU may provide data representing the signal strength of an associated AP to the respective AP. The AP, in communication with the server, then provides the signal strength information to the server where it may be combined with other information (such as signal strengths reported in other portions of the environment) to generate an overall representation of RF coverage. The information may then be converted into the raw data that is provided to the client.

The server may be configured to determine a location of the RF device through various methods. This location can be used to construct an image presented to the user which includes all of the known RF devices in the environment with accompanying RF coverage as will be further seen. For example, the server may use a locationing technique such as time of arrival (ToA) or time difference of arrival (TDOA) data to determine the location of a particular RF device. Alternatively, the RF device may be a fixed portion of infrastructure, the location thereof known to the server in advance. Such location information may be stored on the server. Additional information, such as site survey information, floor plan dimensions, etc., may also be stored. The server may then associate current signal strength information received from an RF device with a known or determined location of the RF device to construct an overall representation of the wireless environment.

In one embodiment, the server provides the raw data formatted in XML. The raw XML data is representative of RF coverage over an entire site. In some cases, the raw data may be representative of several geographical locations, floors, buildings, structures, and the like. A specific implementation may vary the amount of visible coverage shown of a particular site. In any event, the raw data may represent coverage of a single floor plan.

The browser application may then utilize the raw data, in combination with the previously received formatting and setup data, to render the applicable RF coverage for the site. The RF coverage may be depicted in a variety of ways. In one embodiment, the server and client may make use of so-called scaled vector graphics (SVG) technology to display graphical indicators of RF coverage to a user. Like HTML, SVG is written in plain text and rendered by the browser to generate shapes and images which can be animated and made interactive. SVG is also written in XML, which aids compatibility.

SVG allows three types of graphic objects: (1) vector graphic shapes include paths including straight lines and curves, and areas bounded by them, (2) raster graphics images and digital images, and (3) text. Graphical objects can be grouped, styled, transformed and organized into previously rendered objects. Text can be in any XML namespace suitable to the application, which enhances searchability and accessibility of the SVG graphics. The feature set includes nested transformations, clipping paths, alpha masks, filter effects, template objects and extensibility.

SVG drawings can be dynamic and interactive. The Document Object Model (DOM) for SVG, which includes the full XML DOM, allows straightforward and efficient vector graphics animation via ECMAScript or SMIL. A rich set of event handlers such as onmouseover and onclick can be assigned to any SVG graphical object. Because of its compatibility and leveraging of other Web standards, features like scripting can be done on SVG elements and other XML elements from different namespaces simultaneously within the same web page.

RF coverage for a particular environment may dynamically change over time. For example, as users congregate for a meeting in a conference room, their bodies may appreciably affect the RF coverage for a particular area. It is desirable for such changes in RF coverage to be efficiently communicated to a user. To this end, the client may issue a request to the server for updated information regarding a specific portion of the environment. Such a request may be initiated by a user herself, or may automatically be initiated as signal levels are monitored by the client and/or server in various portions of the environment, depending on the functionality desired.

The server responds from the request by providing raw data representative of an incremental portion of the environment (site and/or floor plan). The incremental data may, again, be derived from signal strength data reported by various wireless devices in the environment. The incremental raw data is, necessarily, appreciably smaller in size than the original raw data used to construct the overall RF coverage map. The incremental raw data may be provided on a supplemental basis to update the overall RF coverage representation generated by the client. In one embodiment, the client then re plots the RF coverage for a portion of the environment, which concludes the method.

In one embodiment, this method may proceed in accordance with an Asynchronous Javascript and XML (Ajax or AJAX), development technique. AJAX is asynchronous in that loading AJAX compatible data does not interfere with normal page loading. AJAX function calls are made using JavaScript. Data retrieved using the technique is commonly formatted using XML, as reflected in the naming of the XMLHttpRequest object from which AJAX is derived. Utilizing such techniques as AJAX to display RF coverage information is beneficial due to AJAX's cross-platform nature, usable on a variety of operating systems and computer architectures.

Web pages, unlike native applications, are loosely coupled, meaning that the data they display are not tightly bound to data sources and must be first marshaled (set out in proper order) into an HTML page format before they can be presented to a user agent on the client machine. For this reason, web pages have to be re-loaded each time a user needs to view different datasets. By using the XMLHttpRequest object to request and return data without a re-load, a programmer bypasses this requirement and makes the loosely coupled web page behave much like a tightly coupled application, but with a more variable lag time for the data to pass through a longer "wire" to the remote web browser.

Figure 2:
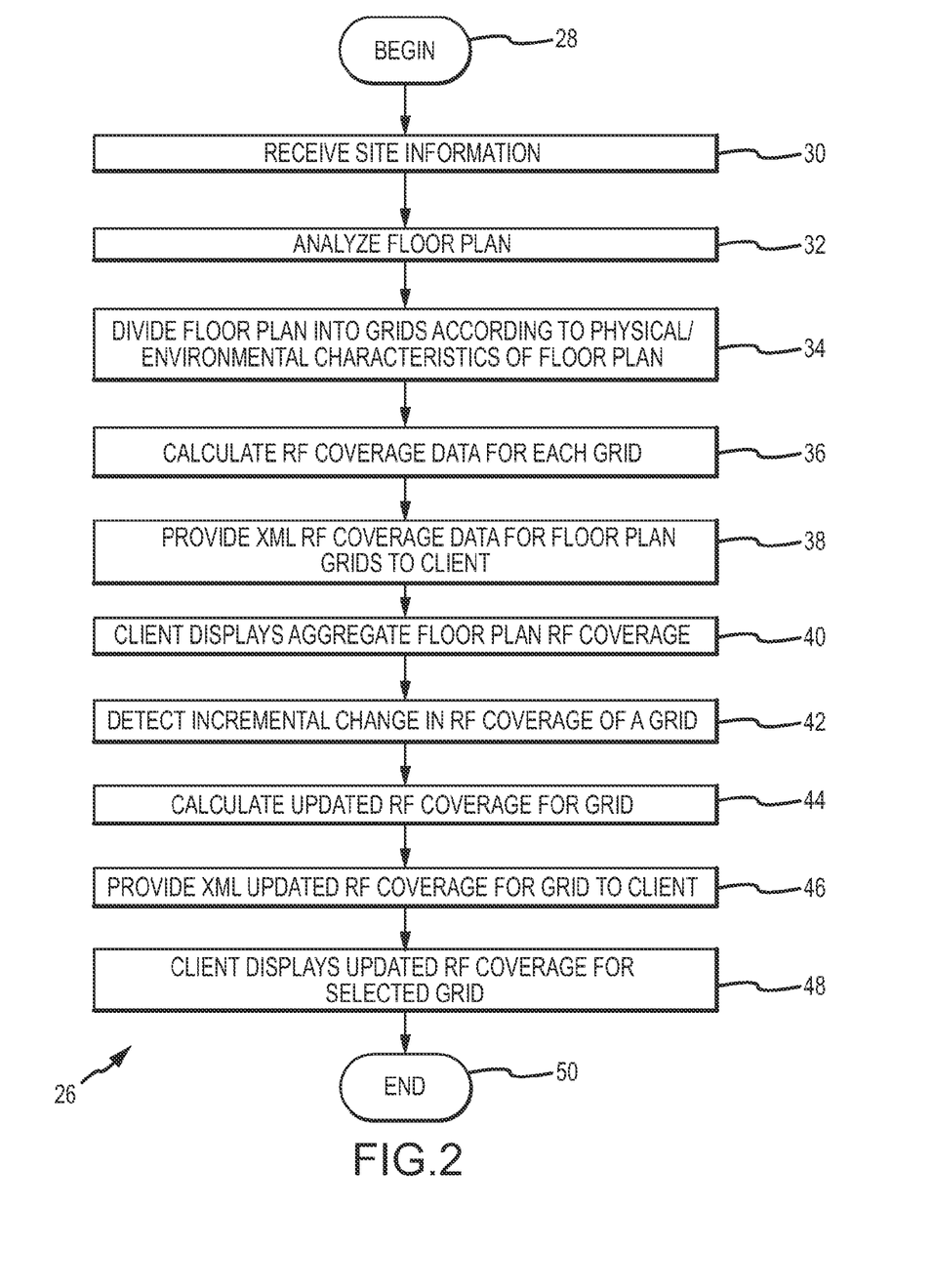
FIG. 2 is an exemplary method of displaying RF coverage.

Taking the foregoing exemplary method further, a system and method of optimizing RF coverage displayed to a user may be implemented. Referring to FIG. 2, an exemplary method 26 of optimizing displayed RF coverage to a user is depicted. Depending upon the implementation realized, portions of method 26 may be executed by operations of the client, the server, or both. Method 26 begins (step 28) with the receipt of site (e.g., floor plan) information (step 30). The site information may include such parameters as dimensions (length and width). The site information may include other information such as location and dimensions of areas of the site where no wireless coverage is desired, or so-called "non-wireless" areas.

Once the site information is received, the site information is analyzed (step 32). Various physical and/or environmental factors may be considered, such as the location and make up of physical barriers, in order to divide the site into so-called "grids" (step 34). In one embodiment, each grid may be assigned default dimensions (e.g., about 3 ft. by about 3 ft.). In another embodiment, the dimensions of each grid may be made dynamic, based on the dimensions of the floor plan, or other physical or environmental characteristics. Accordingly, a series of geographical separation lines may be utilized to render the grids. The separation lines may be related to distance (e.g., feet), or related to other physical or environmental factors of the site.

Processor and/or storage resources may also be taken into account. For example, a particular floor plan analysis may have scaled grid dimensions to ensure that a total number of grids is not exceeded. For a floor plan of about 700 ft. by about 700 ft., the dimensions of each grid may be scaled upwards to be about 33 ft. by about 33 ft., in order to ensure that a threshold of about 15000 grids is not exceeded. In this way, the system ensures that the overall time taken to plot the overall coverage across the same floor plan remains constant.

In an alternative technique, environmental factors such as current signal strength may be also taken into account. The system may perform an analysis of signal strength values before sending the calculated grid dimensions to be rendered by the client. For example, if there are ten (10) consecutive grids, each of width about 3 ft. by about 3 ft., and their respective signal strength (dBm) values (as reported to the server by various RF devices in the environment) fall within a certain threshold (e.g., about 3 dBm), then these ten grids may be combined into a single grid of dimension of about 3 ft.×about 10 ft. (or an equivalent). Such a combined dimension may result in better resource allocation by necessitating less data to be sent. In addition, combining grids of similar signal strength may save the time it takes to plot RF coverage of a portion, or all, of the floor plan.

Returning to FIG. 2, in any event, once the site is divided into a series of grids (again dependent on whichever of the foregoing methodologies is used), the respective RF coverage for each grid is calculated (step 36). Alternatively, if the RF coverage is known, it is associated with each grid. For example, the server may associate a particular RF device's RF coverage with a grid or a series of grids. A signal strength of 5 dBm may be reported for a particular grid by an AP covering the grid. The server may implement mathematical algorithms to extrapolate signal strengths in a nearby region. In this way, the applicable RF coverage for each of the grids in the floor plan are determined and/or calculated. In one embodiment, this RF coverage is encoded as XML raw data and passed to the client (step 38) where it is then displayed as an aggregate site RF coverage map (step 40).

The system (client, server, or otherwise), after a period of time, detects an incremental change in RF coverage for a particular grid or series of grids. Such detection may again, occur automatically as signal strengths are monitored. For example, the AP that originally reported a signal strength of 5 dBm may later report an updated signal strength of 7 dBm. Based on this reported or extrapolated information, the system again determines, or if necessary, calculates the respective RF coverage for the changed grid or grids (step 44). Again, such RF coverage information may be gathered by processing changes in the signal strength data. Again, for example, changes in the signal strength data received by the server from a mobile device, such as a MU or an AP, may be processed to determine the incremental change in RF coverage associated with the mobile device.

The server provides incremental raw data, representative of a small fraction of the total original raw data, to the client (step 46). Again, the incremental raw data may be provided subject to a request of the client for such data. The incremental data is representative of an incremental change in radio frequency coverage for the changed grid or grids. The client processes the raw data through an application, such as a browser, to render and display graphical indicators associated with the change in RF coverage for the respective changed grid or grids (step 48). Method 26 then ends (step 50) for the depicted embodiment, however, generally speaking the method may return to step 42 on an ongoing basis, continually updating based on detected changes in RF coverage for a specific grid or grids.

Figure 3:
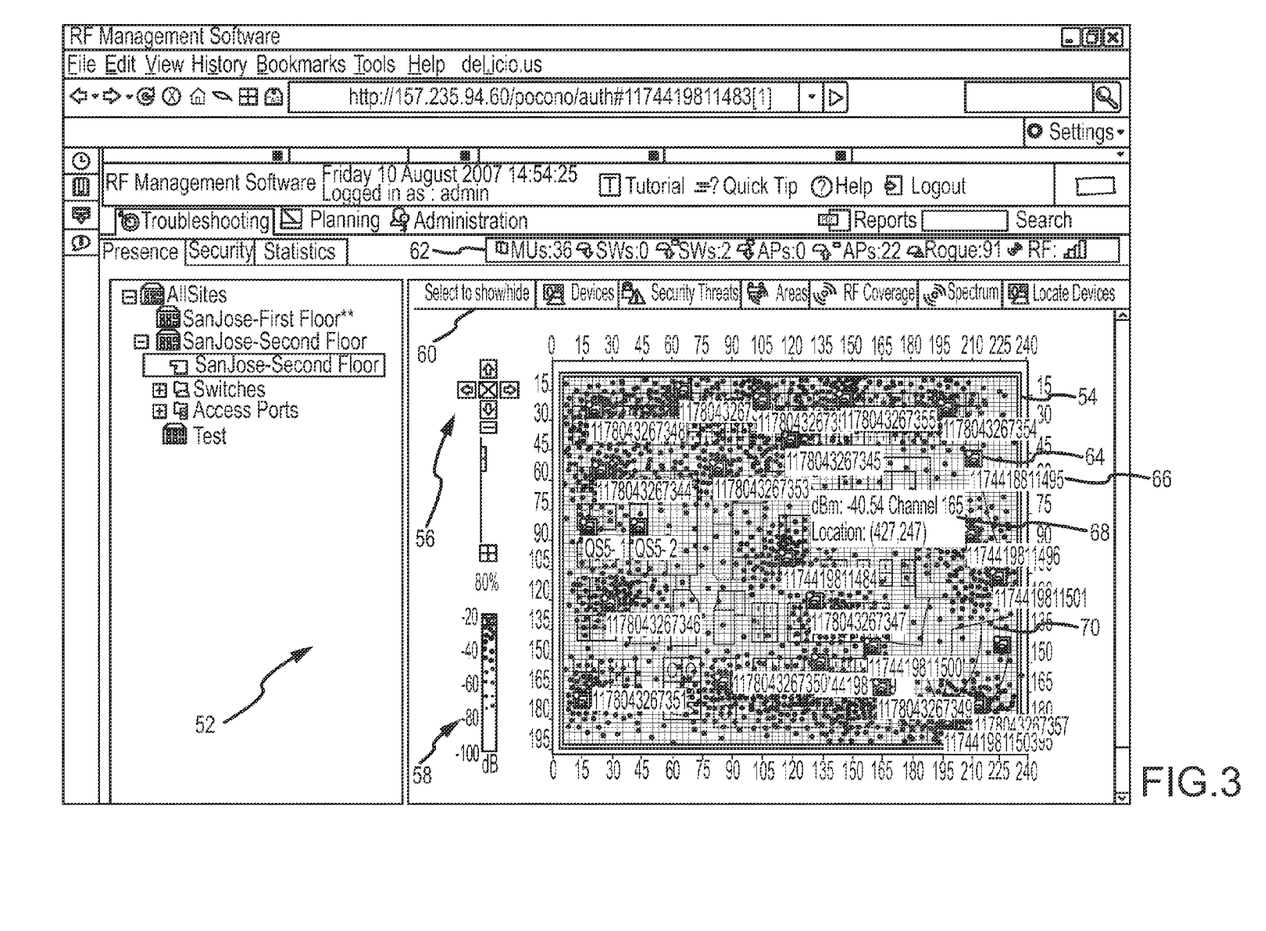
FIG. 3 is an exemplary graphical user interface (GUI) displaying the scope of RF coverage information to a user.

Referring now to the exemplary graphical user interface (GUI) of FIG. 3, a coverage window 52 displays the RF coverage for a specific environment, in this case a floor plan 54 which has been divided into a series of grids 70. For example, portions of method 26 (FIG. 2) may be implemented using the depicted software to allow a client (and thereby, a user) to view, monitor, and configure RF coverage for a specific environment. In the depicted embodiment, each grid 70 represents an area on the floor plan that is approximately 3 ft. by 3 ft. in size. Coverage window 52 is integrated into a browser application operational on the client as previously described. A navigation tool 56 allows the user to move from left, right, top and bottom across the floor plan, respectively. In addition, the user may use the navigational tool 56 to zoom in or out. In the current view, the zoom view is noted at 80%. Signal strength indicator 56 is located below the navigational tool 56. Indicator 56 describes a range of signal strength in decibels (dB). The highest signal strength is represented with the greatest degree of shading, corresponding to −20 dB.

The coverage window 52 includes toolbar 60, allowing a user to select various buttons to show/hide wireless devices, security threats, and RF coverage, for example. Such a toolbar 60 may vary depending upon the specific functionality desired for a particular implementation. In addition, legend window 62 depicts various components of a particular floor plan, such as the applicable number of mobile units, switches and access points.

In the depicted embodiment, an access point 64 is seen. The access point 64 indicator is generated by the client browser using SVG compatible XML data. Respective identification information for the access point 64 is displayed by indicator 66. As shown, various access points are strategically configured across the floor plan to provide consistent RF coverage. Applicable RF coverage for each of the access points is strongest in the areas nearest the access points.

Indicator 68 illustrates exemplary functionality of the GUI, in accordance with exemplary method 26 previously described (FIG. 2). Accordingly, a user may move a mouse indicator (such as an arrow) over a portion of the floor plan. Moving such an indicator may be interpreted by the browser as a request for incremental RF coverage (e.g., changed RF coverage) information for a particular grid. A request is sent to the server for the incremental RAW data, which is received by the client and displayed as indicator 68. Indicator 68 displays specific signal strength information (e.g., dBm: −40.54 on Channel 165) for location 427, 247 of the floor plan (e.g., grid 427, 247). As one skilled in the art will appreciate, the applicable RF coverage area representing the "location" or "portion" of the floor plan may vary depending on a specific implementation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for optimizing radio frequency (RF) coverage, comprising:
    dividing a floor plan of a building according to a plurality of grids based upon a plurality of geographical separation lines dependent on a physical or environmental factor associated with the building;
    calculating radio frequency coverage for each of the plurality of grids to render a plurality of coverages;
    combining, if a difference in signal strength associated with a first and second of the plurality of grids is within a predetermined threshold, the first and second grid into a combined grid;
    providing first data representative of the plurality of coverages to a client;
    monitoring the plurality of grids for a change in signal strength; and
    providing, when the change in signal strength is detected, second data representative of an incremental change in the radio frequency coverage for a first grid of the plurality of grids to the client.

2. The method of claim 1, further including detecting the incremental change in radio frequency coverage for the first grid by processing changes in signal strength data received by a server from a mobile device.

3. The method of claim 2, further including calculating an updated radio frequency coverage for the first grid based on the changes in signal strength data.

4. The method of claim 3, further including providing third data representative of an incremental change in radio frequency coverage for the second grid of the plurality of grids to the client.

5. The method of claim 1, wherein the floor plan is a site floor plan, the site floor plan including at least two buildings.

6. The method of claim 1, wherein providing second data representative of an incremental change in radio frequency coverage is performed subject to a request by the client.

7. A system for optimizing displayed radio frequency (RF) coverage, comprising:
    means for dividing a floor plan of a building according to a plurality of grids based upon a plurality of geographical separation lines dependent on a physical or environmental factor associated with the building;
    means for calculating radio frequency coverage for each of the plurality of grids to render a plurality of coverages;
    means for combining, if a difference in signal strength associated with a first and second of the plurality of grids is within a predetermined threshold, the first and second grid into a combined grid;
    means for providing first data representative of the plurality of coverages to a client; and
    means for monitoring the plurality of grids for a change in signal strength; and
    means for providing, when the change in signal strength is detected, second data representative of an incremental change in the radio frequency coverage for a first grid of the plurality of grids to the client.

8. The system of claim 7, further including means for detecting the incremental change in radio frequency coverage for the first grid by processing changes in signal strength data received by a server from a mobile device.

9. The system of claim 8, further including means for calculating an updated radio frequency coverage for the first grid based on the changes in signal strength data.

10. The system of claim 9, further including means for providing third data representative of an incremental change in radio frequency coverage for the second grid of the plurality of grids to the client.

11. The system of claim 7, wherein the floor plan is a site floor plan, the site floor plan including at least two buildings.

12. The system of claim 7, wherein the second data representative of an incremental change in radio frequency coverage is provided subject to a request by the client.

13. A computer program product, comprising: a non-transitory computer-usable medium having computer-readable code embodied therein for displaying radio frequency (RF) coverage information, the computer program product comprising:
    a first executable computer-readable code configured to cause a computer processor to divide a floor plan of a building according to a plurality of grids based upon a plurality of geographical separation lines dependent on a physical or environmental factor associated with the building;
    a second executable computer-readable code configured to cause the computer processor to calculate radio frequency coverage for each of the plurality of grids to render a plurality of coverages and to combine, if a difference in signal strength associated with a first and second grids of the plurality of grids is within a predetermined threshold, the first and second grids into a combined grid;
    a third executable computer-readable code configured to cause the computer processor to provide first data representative of the plurality of coverages to a client; and
    a fourth executable computer-readable code configured to monitor the plurality of grids for a change in signal strength and to cause the computer processor to provide, when the change in signal strength is detected, second data representative of an incremental change in the radio frequency coverage for the plurality of grids to the client.

14. The computer program product of claim 13, further including a fifth executable computer-readable code configured to cause the computer processor to detect the incremental change in radio frequency coverage for the first grid by processing changes in signal strength data received by a server from a mobile device.

15. The computer program product of claim 14, further including a sixth executable computer-readable code configured to cause the computer processor to calculate an updated radio frequency coverage for the first grid based on the changes in signal strength data.

16. The computer program product of claim 15, further including a seventh executable computer-readable code configured to cause the computer processor to provide third data representative of an incremental change in radio frequency coverage for the second grid of the plurality of grids to the client.

17. The computer program product of claim 13, wherein the floor plan is a site floor plan, the site floor plan including at least two buildings.

18. The computer program product of claim 13, the second data representative of an incremental change in radio frequency coverage is provided subject to a request by the client.

\* \* \* \* \*

UNITED STATES PATENT AND TRADEMARK OFFICE
CERTIFICATE OF CORRECTION

PATENT NO. : 8,185,121 B2
APPLICATION NO. : 11/848674
DATED : May 22, 2012
INVENTOR(S) : Vangati

Page 1 of 1

It is certified that error appears in the above-identified patent and that said Letters Patent is hereby corrected as shown below:

In the Specifications:

In Column 3, Line 7, delete "Microsoft" and insert -- Microsoft® --, therefor.

Signed and Sealed this
First Day of January, 2013

David J. Kappos
*Director of the United States Patent and Trademark Office*